United States Patent Office 3,316,170
Patented Apr. 25, 1967

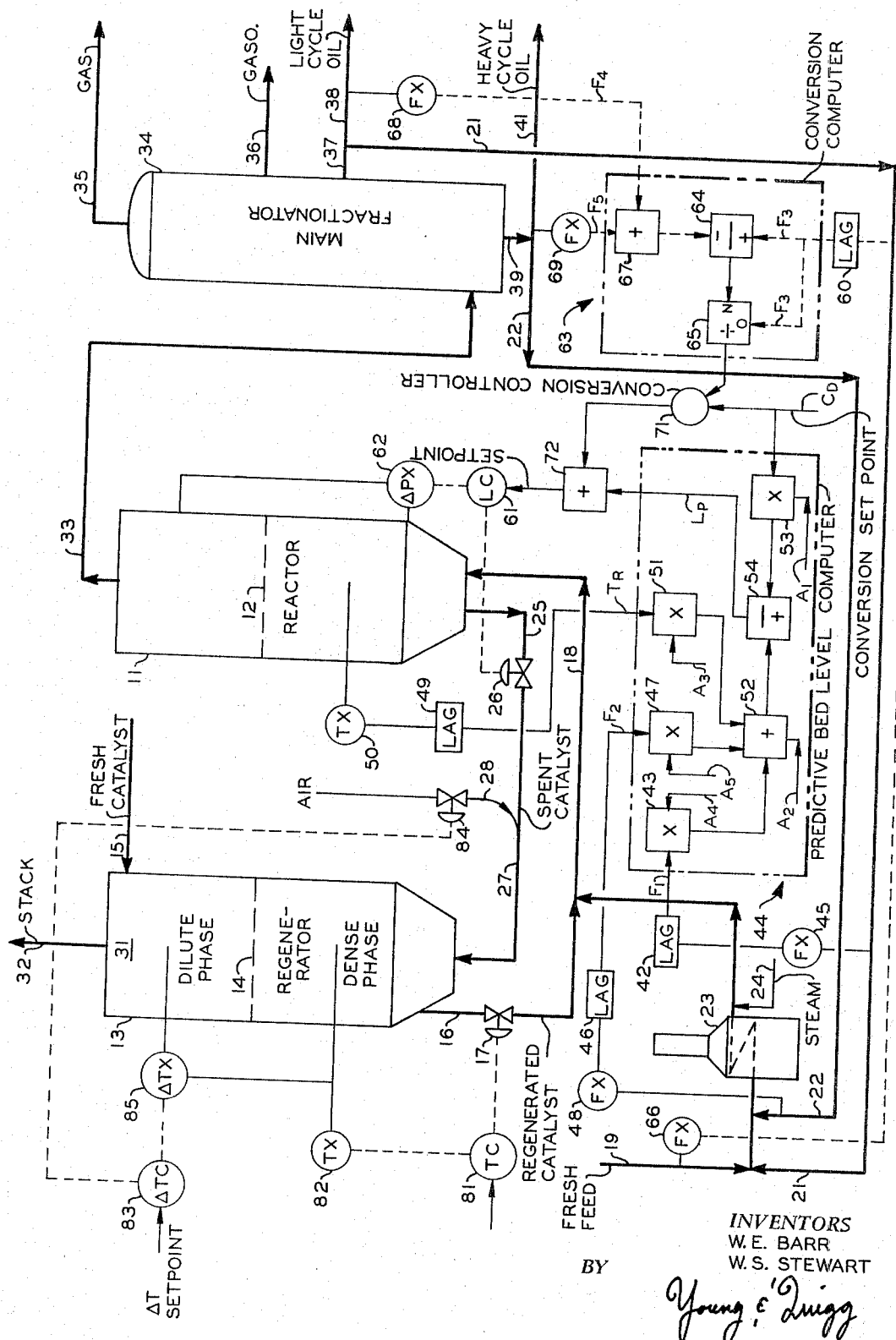

3,316,170
CONTROL SYSTEM FOR MAXIMUM HEAT UTILIZATION IN PROCESS FOR FLUID CATALYTIC DECOMPOSITION CONVERSION OF HYDROCARBONS
William S. Stewart, Bartlesville, Okla., and William E. Barr, Phillips, Tex., assignors to Phillips Petroleum Company, a corporation of Delaware
Filed Jan. 3, 1966, Ser. No. 518,225
6 Claims. (Cl. 208—164)

This invention relates to method and apparatus for automatically maintaining the maximum utilization of heat in a process for the fluid catalytic decomposition conversion of hydrocarbons.

In certain processes for the conversion by decomposition of hydrocarbons in the presence of a fluidized catalyst, in particular that process known as fluidized catalytic cracking of hydrocarbon oils, it has been found that for a given constant conversion, the optimum product distribution is obtained while operating the reactor at the maximum temperature attainable. In prior systems reactor temperature was generally a controlled variable and thus subject to regulation close to a fixed value, generally below the maximum temperature possible considering the heat available to the reactor. In accordance with the present invention, reactor temperature is maintained at its maximum temperature while also maintaining a desired level of conversion. This is accomplished by maintaining the conversion at the desired value through the regulation of the catalyst bed level in the reactor responsive to a predicted value and/or a feedback value representative of the level of the reactor's catalyst bed required to achieve the desired value of conversion; maintaining the temperature in the dense-phase of the regenerator substantially constant at a selected value by varying the rate of withdrawal of regenerated catalyst from the regenerator, thus transferring all excess heat from the regenerator to the reactor; and regulating the oxygen input to the regenerator to maintain the preselected value of temperature differential between the dense-phase and the dilute-phase of the regenerator with the dilute-phase temperature being the higher of the two. By excess heat is meant the heat liberated by combustion above that which is needed to maintain the desired regenerator temperature.

Accordingly, it is an object of the invention to maintain the level of fluidized catalytic conversion substantially constant. Another object of the invention is to provide for the transfer of excess heat from the regenerator to the reactor. Another object of the invention is to operate the reactor at the maximum temperature possible under existing conditions for a given desired conversion level. Other objects, aspects and advantages of the invention will be apparent from a study of the disclosure, the drawing and the appended claims to the invention.

Referring now to the drawing, wherein there is illustrated a schematic representation of a fluid catalytic cracking process embodying the invention, cracking reactor 11 has a mobile or fluidized, dense-phase bed of solid catalytic particles 12 disposed therein. A catalyst regenerator 13 has a fluidized, dense-phase bed 14 disposed therein. Fresh catalyst can be added to regenerator 13 through conduit 15 as required. The regenerated catalyst overflows into outlet conduit 16 and passes through valve 17 into conduit 18 wherein it is fluidized with a mixture of superheated steam and hot hydrocarbon feed. The feed is made up of fresh feed, such as a distillate type of hydrocarbon material, for example virgin gas-oil, from conduit 19; a light cycle oil recycle stream from conduit 21; and a heavy cycle oil recycle stream from conduit 22. The combined feed is passed through a preheater 23 wherein the combined feed is heated to the maximum preheat temperature allowable. Superheated steam from conduit 24 is injected into the thus preheated feed. The regenerated catalyst from conduit 16 is fluidized by the predominately vaporous mixture of hot feed and steam and the resulting fluidized mixture passes through conduit 18 into reactor 11.

Reactor bed 12 may be comprised of a mixture of catalytic particles and non-catalytic solids fluidized by the hydrocarbon and steam vapor. A stream of spent catalyst is withdrawn from bed 12 by way of conduit 25 and passed through valve 26 and conduit 27 into regenerator 13. Air is injected into conduit 27 downstream of valve 26 to fluidize the spent catalyst for conveyance into regenerator 13 and to provide the oxygen required for regeneration. Regeneration of the catalyst by the input air in dense bed 14 generally takes place at a temperature in the range of 950° to 1200° F. The gases from the combustion of the carbonaceous deposits on the catalyst pass upwardly through dense-phase 14 and dilute-phase 31 and are withdrawn from the regenerator 13 by way of conduit 32 and passed to suitable heat and/or catalyst recovery means or to a stack. Dilute-phase 31 is the volume in the regenerator 13 above dense bed 14 which is provided to permit the separation of fine catalyst particles from the combustion gases and to allow limited "afterburning" of carbon monoxide to occur.

The reaction products are removed from reactor 11 in vapor form by way of conduit 33 and passed to suitable recovery apparatus, such as fractionator 34. Fractionator 34 can be a single column or a plurality of columns and is operated to produce four or more product streams. A gas stream generally comprising $C_4$ and lighter materials is withdrawn through conduit 35 while a gasoline stream is withdrawn through conduit 36. A light cycle oil stream is withdrawn from fractionator 34 by way of conduit 37 with a portion thereof being recycled as desired to the feed inlet of the cracking system by way of conduit 21 and the remainder being withdrawn from the system by way of conduit 38. One or more heavy cycle oil streams are withdrawn from separation zone 34 by way of conduit 39 with a portion thereof being recycled to the feed inlet of the cracking system by way of conduit 22 and the remainder being withdrawn from the system by way of conduit 41. The portion of the light cycle oil passed through conduit 38 and the portion of the heavy cycle oil passed through conduit 41 for withdrawal from the system are considered the unconverted products while the gas in conduit 35 and the gasoline in conduit 36 are considered converted products. If desired, the light and heavy cycle oil recycle streams may be further processed through an aromatic separation unit, such as by liquid-liquid extraction, before being recycled to the cracking zone.

The level of the catalyst bed in reactor 11 and thereby the residence time of the vaporized oil in the cracking zone, required to achieve a desired value of conversion can be predicted from the formula:

$$L_p = A_1 C_D - A_2 - A_3 T_R - A_4 F_1 - A_5 F_2$$

where:
$L_p$ is the predicted catalyst bed level,
$A_1, A_2, A_3, A_4$ and $A_5$ are constants,
$C_D$ is the desired value of conversion,
$T_R$ is the temperature of bed 12 in reactor 11,
$F_1$ is the flow rate of light cycle oil in conduit 21, and
$F_2$ is the flow rate of heavy cycle oil in conduit 22.

A signal representative of $F_1$ is applied through lag means 42 to one input of multiplier 43 in predictive bed level computer 44 by flow transmitter 45, operatively connected to conduit 21. A signal representative of $F_2$ is applied through lag means 46 to one input of multiplier 47 by flow transmitter 48, operatively connected to conduit 22. A signal representative of $T_R$ is applied through lag 49 to one input of multiplier 51 by temperature transmitter 52, operatively connected to reactor 11. Signals representative of $A_4$, $A_5$ and $A_3$ are applied to the second inputs of multipliers 43, 47 and 51, respectively. A signal representative of $A_2$ and the output signals, $A_4F_1$, $A_5F_2$ and $A_3T_R$, from multipliers 43, 47 and 51, respectively, are applied to the inputs of adder 52. Signals representative of $A_1$ and $C_D$ are applied to the inputs of multiplier 53. The output, $A_1C_D$, of multiplier 53 is applied to the minuend input of subtractor 54, while the output, $A_2+A_3T_R+A_4F_1+A_5F_2$, of adder 52 is applied to the subtrahend input of subtractor 54. The output of subtractor 54 is $A_1D_D-A_2-A_3T_R-A_4F_1-A_5F_2$, or $L_p$. In a system utilizing only predictive control, the output of subtractor 54 can be applied directly to the setpoint input of reactor bed level controller 61. A signal representative of the actual level of the catalyst bed in reactor 11 is applied to the measured signal input of level controller 61 by differential pressure transmitter 62, operatively connected to reactor 11. The output signal from level controller 61 is applied to valve 26 to maintain the actual catalyst bed level at the predicted setpoint value, $L_p$.

In a presently preferred embodiment, a correction is applied to the value $L_p$ by means of a feedback signal from measured conversion computer 63. Measured conversion, $C_M$, weight or liquid volume fraction as desired, can be defined as:

$$C_M = \frac{(F_3-F_4-F_5)}{F_3}$$

where:

$F_3$ is the flow rate of fresh feed through conduit 19,
$F_4$ is the flow rate of light cycle oil withdrawn from the system by way of conduit 38, and
$F_5$ is the flow rate of heavy cycle oil withdrawn from the system by way of conduit 41.

A signal representative of $F_3$ is applied through lag 60 to the minuend input of subtractor 64 and to the divisor input of divider 65 by flow transmitter 66, operatively connected to conduit 19. A signal representative of $F_4$ is applied to one input of adder 67 by flow transmitter 68, operatively connected to conduit 38, while a signal representative of $F_5$ is applied to the second input of adder 67 by flow transmitter 69, operatively connected to conduit 41. The output, $F_4+F_5$, of adder 67 is applied to the subtrahend input of subtractor 64 to produce an output signal, $F_3-F_4-F_5$, which is applied to the dividend input of divider 65. The output, $$\frac{F_3-F_4-F_5}{F_3}$$

or $C_M$, of divider 65 is applied to the measured signal input of conversion controller 71. A signal representative of the desired value of conversion, $C_D$, is applied to the setpoint input of controller 71. The output of controller 71 is applied as a correction factor to one input of adder 72 while the output of subtractor 54 is applied to the second input of adder 72. The output of adder 72 is then applied to the setpoint input of level controller 61.

The temperature in the dense-phase 14 of regenerator 13 is maintained substantially constant at a preselected value by temperature controller 81 which manipulates valve 17 responsive to the dense-phase temperature as indicated by the output of temperature transmitter 82. This provides for the transfer of the excess heat from the regenerator to the reactor by way of hot, regenerated catalyst flow, thus maintaining reactor temperature at its maximum value under the operating conditions. The temperature of the dilute-phase 31, in regenerator 13 is also maintained substantially constant by differential temperature controller 83, which manipulates valve 84 in the regenerator air inlet conduit 28 responsive to the temperature differential between the dense-phase and the dilute-phase of the regenerator as indicated by the output of differential temperature transmitter 85. In general, the temperature of the dilute-phase is maintained on the order of 5° F. higher than the temperature of the dense-phase. The differential temperature control provides for the injection of sufficient oxygen into the regenerator to complete catalyst burnoff and to cause the limited afterburning in the dilute-phase necessary to maintain the temperature differential, thus insuring that sufficient oxygen is fed into the dense-phase to provide for the regeneration of the catalyst and to supply the heat for transfer to the reactor thereby to cause decomposition.

While the invention has been described in terms of a fluidized catalytic cracking process, it is also applicable to other systems for the fluidized catalytic decomposition conversion of hydrocarbons, including hydroforming, coking, dehydrogenation and other endothermic chemical reactions.

While two recycle streams have been shown, the invention is applicable to such systems which use fresh feed alone or in combination with one or more recycle streams. In such instances, the terms $A_4F_1$, $A_5F_2$ ... $A_iF_j$ are used or omitted from the predicted catalyst bed level computation to correspond to the number of recycle streams. Similarly, one, or more than two, unconverted product streams can be produced instead of the two of the illustrated embodiment.

Reasonable variations and modifications are possible within the scope of the foregoing disclosure, the drawing and the appended claims to the invention.

We claim:

1. In a process for the fluidized catalytic decomposition conversion of hydrocarbons werein regenerated catalyst is withdrawn from a regeneration zone having a dense-phase and a dilute-phase and introduced into a hydrocarbon feed stream, the resulting combined stream is introduced into a fluidized catalytic decomposition conversion reaction zone, the reaction effluent is withdrawn from said reaction zone and separated into at least one converted product fraction and at least one unconverted product fraction, spent catalyst is withdrawn from said reaction zone, a stream of air is admixed with the thus withdrawn spent catalyst, and the mixture of spent catalyst and air is passed into said regeneration zone; the improvement comprising establishing a first signal proportional to the desired value of conversion, establishing a second signal proportional to the temperature within said reaction zone, establishing responsive to said first and second signals of a third signal representative of the predicted value of the level of the catalyst bed in said reaction zone required to maintain the value of actual conversion equal to said desired value of conversion, establishing a fourth signal representative of the actual level of the catalyst bed in said reaction zone, establishing responsive to a comparison of said third and fourth signals a fifth signal representative of the difference between said third and fourth signals, manipulating the rate of withdrawal of spent catalyst from said reaction zone responsive to said fifth signal to vary the actual level of the catalyst bed as required to maintain the conversion at said desired value of conversion, establishing a sixth signal representative of the temperature in the dense-phase of said regenerator, and manipulating the rate of withdrawal of regenerated catalyst from said regeneration zone and the introduction thereof into said hydrocarbon feed responsive to said sixth signal to maintain said temperature in said dense-phase substantially constant and to transfer, by way of the withdrawn regenerated catalyst, excess heat from said regeneration zone into said reaction zone to maintain the temperature in said reaction zone at the maximum value possible for the condition necessary to produce said desired value of conversion.

2. A process in accordance with claim 1 wherein the fluidized catalytic decomposition conversion of hydrocarbons is the fluidized catalytic cracking of hydrocarbons.

3. A process in accordance with claim 1 further comprising establishing a seventh signal representative of the temperature differential between said dilute- and dense-phase of said regeneration zone and manipulating the rate of introduction of said stream of air into said withdrawn spent catalyst to maintain said temperature differential substantially constant.

4. A process in accordance with claim 3 further comprising establishing an eighth signal representative of the flow rate of the portion of said unconverted product fraction withdrawn from the process, establishing a ninth signal representative of the flow rate of fresh feed introduced into said hydrocarbon feed stream, establishing responsive to said eighth and ninth signals a tenth signal respresentative of the actual conversion, establishing responsive to said first and tenth signals an eleventh signal related to the difference between said first and tenth signals, adding said eleventh signal to said third signal to correct said third signal and utilizing the thus corrected third signal in the step of comparison with said fourth signal to produce said fifth signal.

5. A fluidized catalytic cracking process in accordance with claim 4 wherein said hydrocarbon feedstream is an admixture of fresh feed, recycled light cycle oil and recycled heavy cycle oil and said unconverted product fraction comprises a heavy cycle oil product stream and a light cycle oil product stream; establishing a twelfth signal representative of the flow rate of said recycled light cycle oil, establishing a thirteenth signal representative of the flow rate of said recycled heavy cycle oil; and wherein said third signal is established in accordance with the equation:

$$L_p = A_1 C_D - A_2 - A_3 T_R - A_4 F_1 - A_5 F_2$$

wherein:
$L_p$ is said third signal,
$A_1$, $A_2$, $A_3$, $A_4$ and $A_5$ are constants,
$C_D$ is said desired value of conversion,
$T_R$ is said reactor temperature,
$F_1$ is said flow rate of recycled light cycle oil, and
$F_2$ is said flow rate of recycled heavy cycle oil.

6. A process in accordance with claim 5 further comprising establishing a fourteenth signal representative of the flow rate of said light cycle oil product stream and establishing a fifteenth signal representative of the flow rate of said heavy cycle oil product stream, and wherein said tenth signal is established in accordance with the equation:

$$C_M = \frac{(F_3 - F_4 - F_5)}{F_3}$$

where:

$C_M$ is said tenth signal,
$F_3$ is said ninth signal,
$F_4$ is said fourteenth signal, and
$F_5$ is said fifteenth singal.

References Cited by the Examiner
UNITED STATES PATENTS

| | | | |
|---|---|---|---|
| 2,905,635 | 9/1959 | Harper | 208—164 |
| 3,175,968 | 3/1965 | Berger | 208—164 |
| 3,213,014 | 10/1965 | Atkinson et al. | 208—113 |

DELBERT E. GANTZ, *Primary Examiner.*

H. LEVINE, *Assistant Examiner.*